Patented Jan. 23, 1940

2,188,272

UNITED STATES PATENT OFFICE 2,188,272

SHAPED ARTICLE AND PROCESS OF PREPARING IT

Arthur Voss, Frankfort-on-the-Main-Hochst, and Hermann Stärk, Bad Soden in Taunus, Germany, assignors to I. G. Farbenindustrie Aktiengesellschaft, Frankfort - on - the - Main, Germany No Drawing. Application December 31, 1936, Serial No. 118,679. In Germany January 16, 1936

10 Claims. (Cl. 260—36)

The present invention relates to shaped articles and to a process of preparing them.

Valuable products may be prepared by a mixed polymerization of vinyl esters and compounds of the following formula:

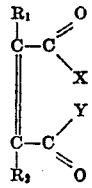

wherein $R_1$ and $R_2$ stand for hydrogen, halogen, the sulfonic acid radical or an alkyl, aryl or aralkyl radical and X and Y stand for OH, O-alkyl, O-aryl or halogen or X and Y together stand for oxygen.

Such polymerization products are described for instance in U. S. Patent No. 2,047,398. The quantitative proportion of the two components to each other may vary within a wide range.

The products prepared by the mixed polymerization process, in so far as they contain saponifiable groups, may be transformed with the aid of a saponifying agent into new substances, the chain of which probably contains alternative carboxyl groups and hydroxyl groups. It is possible, for instance, by merely boiling for a prolonged time with water to transform the mixed polymerization product of maleic anhydride and vinyl chloride into a watersoluble substance.

This watersoluble substance which probably has the constitution of a hydroxycarboxylic acid, is, however, rapidly transformed into a substance insoluble in water. It may be supposed that during this process a formation of nets between the several chains occurs, because the high degree of insolubility (especially on heating) even in a feeble alkali would be abnormal in the case of single unbound chains.

In a similar manner other mixed polymerization products, for instance those from maleic anhydride and vinyl ester (acetate) or from maleic acid ester and vinyl ester may be saponified. In general, all mixed polymerization products known, for instance from U. S. Patent No. 2,047,398 may be used, one component of which is an organic or inorganic vinyl ester. In each case substances are obtained which according to the kind of the components and their quantitative proportion to each other show only some minor differences in their properties. They are whitish, finely to coarsely pulverized or granular to fibrous masses similar to the derivatives of cellulose which are insoluble in water and likewise in all other solvents and are also infusible and can hardly be shaped. The saponification may be carried out in a manner in itself known for instance with the aid of a strong acid, such as hydrochloric acid, sulfuric acid or with a strong alkali such as sodium hydroxide, potassium hydroxide, sodium carbonate and potassium carbonate. The operation may be conducted in an aqueous solvent as well as in an organic solvent, for instance in alcohol.

Now we have found, that unexpectedly, in spite of these properties, it is possible to mould these lactone-like highly polymerized products by the addition of suitable softening agents and water. As softening agents there may be used sparingly volatile or non-volatile polyhydric alcohols which are soluble in water or at least capable of swelling in water, such as glycols especially glycerine, also sorbite, penta-erythrite, polyglycols or hydroxycarboxylic acids such as glycolic acid, lactic acid, saccharic acid and the like, i. e. generally compounds selected from the group consisting of aliphatic polyhydric alcohols and aliphatic hydroxy carboxylic acids. On mixing these components with the polymeric compound in the presence of water, a plastic mass is obtained which may readily be shaped in the usual manner. By suitable mechanical means (presses or the like) ropes, plates, bands, tubes or other shaped articles may be made. Besides the softening agents filling agents of various kinds such as soot, zinc, zinc oxide, magnesium oxide, red lead, iron oxide, may also be added. For the pressing temperatures of about 80° C. to about 120° C. are suitably used but the operation may likewise be performed at a raised temperature, for instance at about 140° C. The necessary pressures vary according to the composition of the mixtures, they may for instance be between 5 kilograms and 150 kilograms per square centimeter.

The quantity of the alcohol added may likewise vary within a wide range. Suitably the same quantity of alcohol is used from as that of the solid mixed polymerization product, but there may likewise be used 20 per cent. to 100 per cent. Similarly the quantity of water may be varied between 20 per cent. and 120 per cent of the polymerization product.

In comparison with the artificial masses hitherto known the articles obtainable according to this process have the great advantage, besides a remarkably high elasticity and resistance against strong mechanical strains that they are stable to all solvents, even very reactive solvents as well as mixtures of solvents and are stable to water. This is very surprising, for most of the known plastic masses or the articles shaped from them, in case they have high elasticity are sensitive to solvents (caoutchouc, cellulose derivatives, other synthetic polymeric compounds) or in case they are insoluble they are relatively brittle (phenol aldehyde masses as well as casein aldehyde masses, vulcanized fiber, moulded masses from urea). Especially the stability to water is very remarkable in view of the use of watersoluble softening agents. Though these softening agents can hardly form a chemical compound with the polymeric substance during the shaping which generally occurs below 100° C., they are intimately mixed with this substance so that they may only with difficulty be separated with the aid of hot water.

These remarkable properties render the shaped masses obtainable by the invention suitable for industrial purposes which have to fulfil particularly high requirements, for instance as containers, ducts packing materials which come into contact with solvents, especially with fuels (benzine and the like).

The following examples serve to illustrate the invention, but they are not intended to limit it thereto; the parts are by weight:

(1.) 100 parts of the saponification product of a mixed polymerizate or vinyl acetate and maleic anhydride are intimately mixed with 25 parts of dibutylene glycol and 50 parts of water and at about 80° C. tubes are made by means of an extrusion press. These tubes are very elastic while showing a high tensile strength and are insensitive to organic solvents or mixtures of fuels.

(2.) 100 parts of the saponification product of a mixed polymerizate of vinyl acetate with maleic acid dimethylester are intimately mixed with 30 parts of glycolic acid, 80 parts of water and 50 parts of soot. Tubes are pressed from this mixture as described in Example 2 which, besides a high mechanical strength have a perfect stability to organic solvents and are likewise insensitive to water.

(3.) 100 parts of a saponification product of a mixed polymerizate of 4 parts of vinyl formate and 1 part of maleic acid dimethylester are intimately mixed with 45 parts of tri-ethanol amine and 100 parts of water and pressed at about 80° C. to 90° C. so as to obtain tubes which after having been dried show a very high tensile strength and elasticity and are insensitive to organic solvents and fuels.

(4.) 30 parts of fibrous leather waste are added to a mixture of the substances of Example 3 and the whole is mixed together. The tubes prepared from this mixture are distinguished by a very good stability. In order to increase their resistance to the external action of water they may be coated with a suitable lacquer for instance a lacquer of acetyl cellulose or polyvinyl formate. Pigments of various kinds such as aluminium bronze may be added to the lacquer.

We claim:
1. The process of moulding a product obtained by saponifying the vinylic ester group of a mixed polymerization product of a vinyl ester with a compound of the following formula:

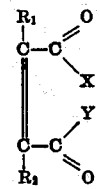

wherein $R_1$ and $R_2$ stand for substituents selected from the group consisting of hydrogen, halogen, the sulfonic acid radical, an alkyl, aryl and aralkyl radical and X and Y stand for substituents selected from the group consisting of OH, O-alkyl, O-aryl and halogen or X and Y together stand for oxygen, which process comprises moulding the saponification product thus obtained in the presence, based on said saponification product, of from 20 per cent to 100 per cent of a compound selected from the group consisting of aliphatic polyhydric alcohols and aliphatic hydroxy carboxylic acids and from 20 per cent to 120 per cent of water.

2. The process of moulding a product obtained by saponifying the vinylic ester group of a mixed polymerization product of a vinyl ester with a compound of the following formula:

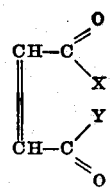

wherein X and Y stand for substituents selected from the group consisting of OH, O-alkyl, O-aryl and halogen or X and Y together stand for oxygen, which process comprises moulding the saponification product thus obtained in the presence, based on said saponification product, of from 20 per cent to 100 per cent of a compound selected from the group consisting of aliphatic polyhydric alcohols and aliphatic hydroxy carboxylic acids and from 20 per cent to 120 per cent of water.

3. The process of moulding a product obtained by saponifying the vinylic ester group of a mixed polymerization product of a vinyl ester with a compound of the following formula:

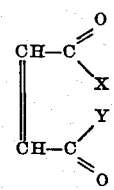

wherein X and Y stand for substituents selected from the group consisting of OH, O-alkyl, O-aryl and halogen or X and Y together stand for oxygen, which process comprises moulding the saponification product thus obtained in the presence, based on said saponification product, of from 20 per cent to 100 per cent of a compound selected from the group consisting of aliphatic polyhydric alcohols and aliphatic hydroxy carboxylic acids and from 20 per cent to 120 per cent of water and in the presence of filling agents.

4. The process of moulding a product obtained by saponifying the acetyl groups of a mixed polymerization product of vinyl acetate and maleic anhydride which process comprises moulding the saponification product thus obtained in the presence, based on said saponification product, of from 20 per cent to 100 per cent of dibutylene glycol and from 20 per cent to 120 per cent of water.

5. The process of moulding a product obtained by saponifying the formyl- and ester groups of a mixed polymerization product of vinyl formate with maleic acid dimethylester which process comprises moulding the saponification product thus obtained in the presence, based on said saponification product, of from 20 per cent to 100 per cent of triethanol amine and from 20 per cent to 120 per cent of water.

6. The moulded products in accordance with claim 1, said products being insoluble in organic solvents, especially in fuel mixtures.

7. The moulded products in accordance with claim 2, said products being insoluble in organic solvents, especially in fuel mixtures.

8. The moulded products in accordance with claim 3, said products being insoluble in organic solvents, especially in fuel mixtures.

9. The moulded products in accordance with claim 4, said products being insoluble in organic solvents, especially in fuel mixtures.

10. The moulded products in accordance with claim 5, said products being insoluble in organic solvents, especially in fuel mixtures.

ARTHUR VOSS.
HERMANN STÄRK.